Nov. 8, 1927.
J. H. MONTAGUE
CLAMP
Filed Dec. 31, 1926
1,648,695
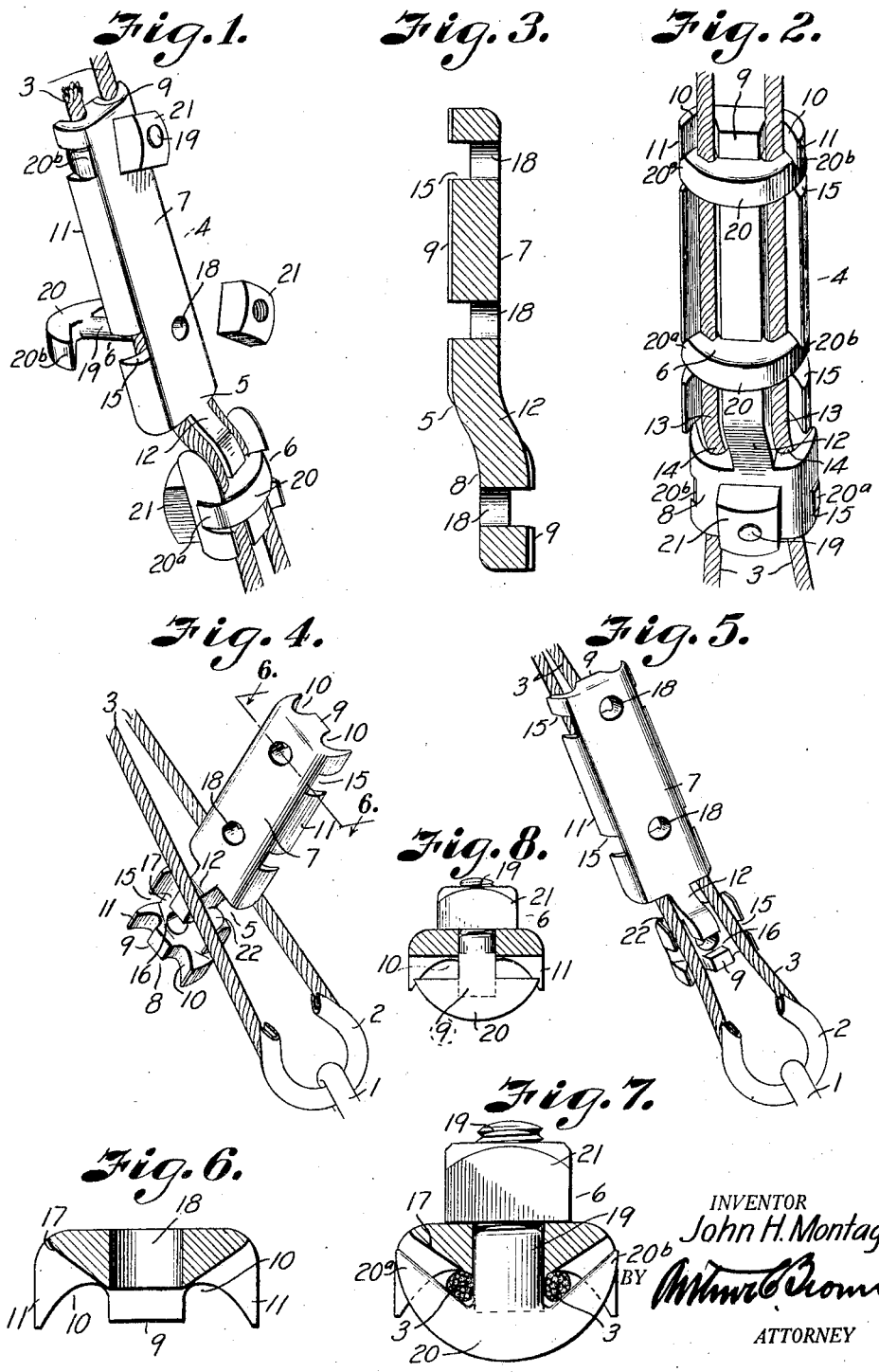
INVENTOR
John H. Montague.
BY
ATTORNEY Patented Nov. 8, 1927.

1,648,695

UNITED STATES PATENT OFFICE.

JOHN H. MONTAGUE, OF INDEPENDENCE, MISSOURI.

CLAMP.

Application filed December 31, 1926. Serial No. 158,256.

My invention relates to clamps and more particularly to clamps used for securing brace cable.

My purpose is to provide a clamp that can easily be engaged with the two branches of a tautened brace loop, and that can be locked thereon in a manner to assure a high degree of security.

The clamps ordinarily used for fastening an end of a guy wire, a rod or cable to an anchor post comprise mated halves having co-operating channels for the reception of the standing and the hauling parts of the rope or cable, the halves being locked together by bolts. The two parts of a loop lie in the clamp parallel to each other and to the plane of the guy cable, the frictional influence of the embracing locked clamp preventing slippage.

The device I offer consists of a body member that represents one of the mating halves of the conventional clamp, and bolt members that represent the other mating half, my structure providing that parts of the cable loop shall rest in grooves of the body member and that the bolt members having arms that seat in transverse slots, shall compress the cable at a plurality of points against the body member. Another feature consists of provision of a diverted course for the cable in the grooves of the body, and means for clamping on each portion of the course. Novelty in structure permits particularly easy application of my device to the loop of a guy cable. Various advantageous elements of structure will be disclosed in the description with reference to the drawings in which:

Fig. 1 is a perspective view of my device applied to a guy cable loop.

Fig. 2 is a rear perspective view.

Fig. 3 is a longitudinal cross section.

Fig. 4 illustrates the manner of applying the device to a taut loop.

Fig. 5 illustrates a further step in the application of the device to a taut loop.

Fig. 6 is a cross section on the line 6—6 of Fig. 4.

Fig. 7 is a view of a bolt member in place associated with a clamp and cable shown in cross section.

Fig. 8 is a view of a modified form of bolt member in which the inner surface of the head is flat.

Referring more in detail to the drawings:

1 designates an eye bolt of a guy rod or eye bolt element, 2 a thimble engaged with the eye bolt for accommodating the ground or dead end of a guy cable 3 which is, as it were, rove in the pulley block of the thimble and looped, the cable being illustrated in tautened condition and functioning as the means of staying a telephone pole (not shown) or like holder of the dead end of a cable. The hauling part of the guy cable so looped and as held temporarily in functioning position by a tautening influence not shown, must be secured in engagement with the anchoring element, so that the tautening influence may be released, and this is done by the application of a clamp 4.

The clamp comprises a body member 5 and a plurality of bolt members 6, the bolt members corresponding to a mating half in terms of the ordinary clamp comprised of similar halves. The body member comprises a shank portion 7 and a head portion 8 each having a longitudinal central rib 9 and channels 10 on each side of the rib and keeper flanges 11 marking the longitudinal edges of the shank and head; flanges forming the outside boundaries of the said channels. I am designating these elements, namely, the rib, channels and flanges, formed in the shank and in the head, by the same numerals in the cases of both the two portions since the elements are similar in these portions but have this distinction, that the elements mentioned possessed by the head are directed oppositely to the same elements possessed by the shank. A neck 12 which is substantially an intermediate portion of the said rib, connects the shank and the head, and spaces the flanges and channels of the head from the same elements of the shank. The plane of the head channels is parallel with the plane of the shank channels but depressed therefrom so that a wire looped and positioned as designed is bent as at 13 in Fig. 2 at the points of departure from the shank channels and again bent at 14 to restore parallel and rectilinear condition in their placement in the channels of the head.

I preferably provide maximum spacing laterally between the upper edges of the flanges and the top of the rib whereby seating of the wire in the channels is facilitated while the bottoms of the channels are relatively narrow. The channels are so formed that their lowest area is adjacent the rib as disclosed in Figs. 6 and 7, though any supplemental longitudinal concavity adapted to the size of the wire for the snug seating of the wire in the channels, may be provided. The shank and the head portions of the body have sockets 15, the portions 16 of which cutting the rib have bases in a plane spaced from the bottom of the channels. The flange bases of the sockets taper downwardly and outwardly, as disclosed especially in Figs. 6 and 7, to the outer walls of the flanges. Bolt holes 18 are provided for the head and shank axially of the rib and centrally of the sockets. The sockets and bolt holes are adapted for the reception of the bolt members 6 of the clamp, a bolt member comprising threaded stem 19 and hooked head 20, the hooks 20$^a$ and 20$^b$ having plane under surfaces angularly presented to the stem whereby they are adapted for seating in a socket and for engagement of the hooked head with the cable. The illustrated formation of hooks and socket (Fig. 7) discloses the flat under surface of the hooks, and the cable distorted thereagainst.

The cable being arranged in the channels of the body member of the clamp, the bolts are inserted, their hooks engaging the cable, and nuts 21 are applied to secure the bolts for functioning of the clamp halves in relation with the cable.

In constructing my clamp I will taper the end of a channel of a head as suggested at 22 (Fig. 5) to provide a curving surface for the contact of the portions of the cable bent thereover in diversion from the shank toward the head portion and into the head portion. I may also provide other similarly adjusted surfaces to obviate hazard of fraying or shearing the strands of the cable either in applying the device or in the functioning thereof.

My device having been provided as described, it will be observed that the bending of the cable in passing from the shank to the head presents a factor of security, in that a purchase is provided on a fulcrum for the resistance by the locking means to the tendency of the cable to withdraw. A further improved factor of security resides in the plurality of bolt members each of which engages separate portions and presses them against the body member, and so provides means that operate as locks against the longitudinal movement or slippage of the cable as contrasted with the purely peripheral frictional influence on the standing and the hauling parts of the cable each positioned rectilinearly in the ordinary clamp members.

It is obvious that in the functioning of my device the several portions of the cable that lie between bolts retain their normal diameter; and these portions would have to be compressed to pass through the reduced aperatures formed by the adjacency of a bolt hook to the seat of a socket, there being six such normal diameter portions of cable and six such apertures, in the illustrated use. It is by this structure that the beforementioned plurality of locking means against slippage of the cable are provided.

One difficulty in applying a clamp to a tautened loop resides in the effort necessary to bring the spaced parts of the looped cable together at the area thereof where it is desired to apply the clamp.

I wish therefore to call attention to the manner of applying my device to a loop of a tautened guy cable, wire rope or the like, as disclosed in Figs. 4 and 5, my structure possessing specific advantages for application. Fig. 4 illustrates the method of introducing my clamp to the tautened cable loop. The head portion is projected edgewise into the loop and then drawn away from the anchor thimble or eye toward the branches of the cable that are adjacent each other due to the position and operation of the tautening means. I then rotate the body member so that the two branches of the cable adjoin the neck 12 in perpendicular plane with the axes of the head channels and therefore in the same relation to the channels of the shank, the cable being positioned between the projecting edges of the flanges. I then depress the shank, the motion elevating the head, whereupon with slight manipulation, the cable may be engaged in the channels of the head and of the shank as disclosed in Fig. 5. The loop branches being laterally restrained by the flanges, I project the body member toward the saddle, drawing the branches together in a manner that is obvious.

I may insert the bolts 6 after permanently positioning the body member; or I may insert one or more bolts and attach the nuts thereto as a means of preventing escape of the cable branches from the body member during the process of establishing the body member in the desired position.

In adaptation of my device for the purpose of securing a relatively large dead end cable and under circumstances requiring heavy strain, a bolt would be inserted in the head and the threading of the nut thereon, the cable loop being engaged in the grooves of the head, would serve to assist in compressing and bending the cable into the head grooves. In such case the outline of the bolt head provided may be of modified form, having hooks with flat under surfaces as shown in Fig. 8, the head features being modified also as shown to provide flanges projecting beyond the altitude of the rib so that the bolt head may become engaged with the flange elements of the socket for restraint of the bolt against rotation while the nut is being threaded to cause the bolt to influence the cable inwardly of the grooves.

I may also provide other and analogous modifications of the hook forms; for example, hooks having curved under surfaces, bolts showing a sharp angular jointure of hook with stem, and bolts having an angular recess in each hook adjacent the stem.

Among the adaptations and variant applications of my device, are its use as a splicing means, in which case a plurality of portions, three, four, five, etc., may be provided such as those illustrated herein as shank and head, and of desired proportions and relations, the portions diverted as the proposed use may suggest. A portion of the device as adapted to splicing clamp function may be provided with channels of different dimensions and bolts of differing type for the accommodation of ropes and cables of different size and nature, for example, a rope and a wire cable to be clamped together end to end.

The described facility with which my device may be applied to a guy loop, serves also in case of a guy cable rove in an eyebolt, the taut branches lying close together; the head being easily insertable sidewise between the branches, and rotation thereof producing positioning for engagement of the branches with the head and shank flanges.

What I claim and desire to secure by Letters Patent is:

1. A clamp for securing cable and the like, comprising a body having a shank portion and a head portion integral with the shank portion, the shank portion having longitudinal grooves for receiving the cable and transverse sockets, the head portion having longitudinal grooves oppositely directed to the grooves of the shank portion and transverse sockets, bolts, hooked heads on the bolts for reception by the said sockets and for engagement with the cable, and nuts for locking the hooked heads in position.

2. A clamp for securing relatively parallel cable and the like, comprising a body having a shank portion and a head portion in parallel spaced planes, a neck integral with said portions and connecting the same the shank portion having longitudinal grooves for receiving the cable and transverse sockets, the head portion having longitudinal grooves oppositely directed to the grooves of the shank portion, bolts provided with hooks to be received by the said sockets, and nuts for locking the bolts in engagement with the body.

3. A clamp for securing relatively parallel wires and the like, comprising a body having a shank portion and a head portion in parallel spaced planes, a neck integral with the shank and head portions and spacing the same, the shank portion having longitudinal grooves for receiving the cable and transverse sockets, the head portion having longitudinal grooves oppositely directed to the grooves of the shank portion, bolts provided with hooks, the hooks adapted to be received by the said sockets, and nuts for locking the bolts in engagement with the body.

4. A clamp for securing a cable anchor loop, comprising a body member and bolt members adapted to mate with the body member, the body member comprising a shank portion and a head portion, keeper flanges forming channels on each side of the shank member for reception of the cable, the shank and the flanges having transverse, aligning, outwardly and downwardly tapering slots, the head portion having keeper flanges longitudinally aligned with the flanges of the shank and forming channels on each side of the head portion for reception of the cable, the head portion and the flanges thereof having aligned transverse slots, and the bolt members having hooked heads for engagement in the said slots of the shank and head portions of the body member, and nuts for securing the bolts with the body member.

5. In a splicing device for ropes and the like, a body member having portions provided with openings presented in opposite directions and spaced from each other to receive parts of the ropes, and means for securing the said parts with the said portions.

6. In a clamp for splicing cables and the like, a body member having alternately oppositely facing integral portions provided with keeper flanges, the flanges of one portion spaced from the flanges of an adjacent portion, the flanges adapted to engage parts of the cables, and means for securing the said parts with the said portions.

7. A splicing device for cable, comprising a cable-receiving member comprising a head portion provided with flanges, a shank portion provided with flanges directed oppositely to the flanges of the head portion, and a neck portion integral with the body and the shank portions and spacing said portions, and means for securing cable portions to the cable-receiving member.

In testimony whereof I affix my signature.

JOHN H. MONTAGUE.